Patented May 29, 1951

2,554,946

UNITED STATES PATENT OFFICE 2,554,946

PROCESSES FOR MANUFACTURING SUBSTITUTED THIOPYRUVIC ACIDS

Jean Gustave Himbert and David Libermann, Paris, France, assignors to Société: Chimie et Atomistique, Paris, France, a French company No Drawing. Application July 28, 1948, Serial No. 41,176. In France May 15, 1948

2 Claims. (Cl. 260—516)

A process has been known since 1921 (Granacher, Helv. Ch. Act., vol. 5, page 610) for manufacturing substituted thiopyruvic acids, which comprises the steps consisting in condensing aldehydes with 4 - oxo - 2 - thion-thiazolidine (rhodanine), of the formula:

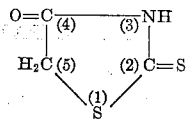

and then subjecting the condensation product to cleavage (splitting of the molecule) with a 15% caustic soda solution at boiling point (about 100° C.).

This method, which may give high yields when small quantities of substance are treated, nevertheless has numerous drawbacks due to the toxicity of rhodanine, to its comparatively high cost, and to the necessity of operating at high temperature, to the formation of by-products with colouring properties and particularly to the impossibility of effecting the cleavage with a substantial quantity of substance owing to the fact that in this case a sufficiently uniform heating cannot be obtained. As soon as the operation is carried out with more than 20 or 25 g. of condensation product, amorphous substances are obtained which are insoluble in the usual solvents and are useless as a starting material for subsequent syntheses. This method is therefore of no industrial value.

The applicants have discovered that the rhodanine can very advantageously be replaced by 2-4-dioxo-thiazolidine (thiazolidione) of the formula:

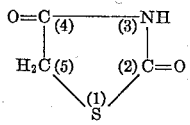

which enables the cleavage to be effected at a lower temperature (about 50° C.) without being limited by the quantities to be treated, so that this process is suitable for industrial exploitation.

The process according to the invention therefore consists in condensing thiazolidione with an aliphatic or a homo- or heterocyclic aldehyde or with an aliphatic or cyclic ketone.

The condensation products are crystallized, slightly coloured or colourless substances which can be readily purified.

The yields are high with aldehydes, but slightly lower with ketones.

Cleavage is effected with a 15% caustic soda solution at a temperature of 40 to 50° C. The reaction is complete when the greater part of the product has dissolved; this requires 1 to 5 days according to the nature of the starting product. In any case, the mixture must be kept at least 24 hours at the temperature indicated, even if the dissolution takes place before.

The reaction takes place according to the following formulae, in the case of an aldehyde, in which R represents an aliphatic or a homo- or heterocyclic radical:

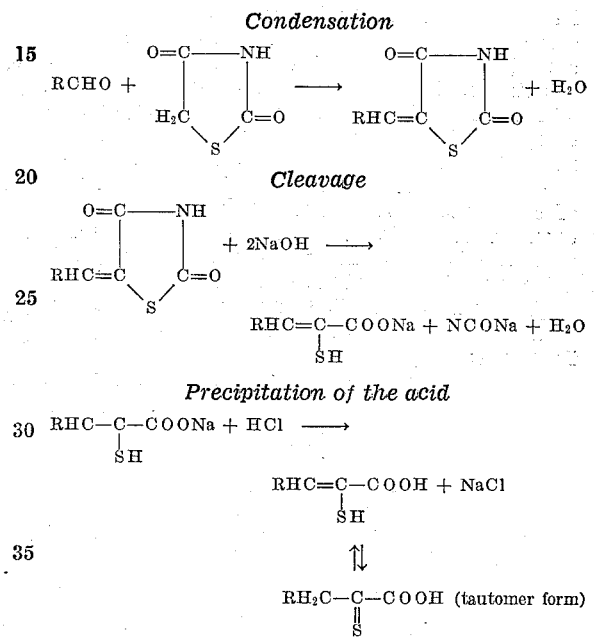

EXAMPLES

1. Phenylthiopyruvic acid

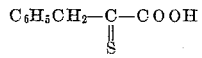

A mixture of 106 g. of benzoic aldehyde, 117 g. of thiazolidione, 250 g. of freshly melted sodium acetate and 650 cc. of glacial acetic acid, are heated in a reflux apparatus for one hour.

After cooling, the mass is poured into 4 litres of water, the precipitate formed is centrifugated and subjected to a current of steam in order to eliminate the uncombined benzoic aldehyde.

100 g. of the product thus obtained (+248° C.) are finally pulverized and set in suspension in 620 cc. of 15% caustic soda solution. This mixture is kept in an oven which is regulated at 40-42° C., and the mixture is stirred from time to time. After 4 days there remains very little precipitate and the light orange coloured liquid is filtered. It is cooled in iced water and the product is precipitated by adding fairly quickly the excess of 10% hydrochloric acid which has previously been cooled.

Phenylthiopyruvic acid is immediately precipitated in a crystallized and colourless form. When centrifugated and dried, it melts at 118.5° C. After recrystallization in dilute alcohol it melts at 129°.

2. *Furylthiopyruvic acid*

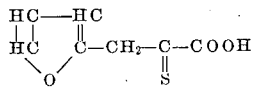

96 g. of freshly distilled furfurol are heated with 117 g. of thiazolidione, 250 g. of melted sodium acetate and 650 cc. of glacial acetic acid. After heating in a reflux apparatus for one hour, the mixture is allowed to cool and poured into 4 litres of water. Furfurylidene-thiazolidione is precipitated in a crystallized and colourless form; it melts at 231° C.

100 g. of the foregoing product are mixed with 630 cc. of 15% caustic soda solution. Dissolution takes place quickly and the solution is then kept in an oven at 40-42° for 24 hours. The brownish solution is filtered and then cooled by iced water. Precipitation is then effected with dilute hydrochloric acid. The furylthiopyruvic acid thus obtained is yellow and melts at 114° C.

Thiopyruvic acids have many uses. The great lability of sulphur in the alpha position is particularly suitable for organic synthesis. Thiopyruvic acids can be used as a starting point for the manufacture by synthesis of a large number of substances, amongst which mention may for example be made of substituted pyruvic acids, substituted acetic acids, substituted propionic acids, substituted primary amines, etc.

Having now described our invention what we claim as new and desire to secure by Letters Patent is:

1. A process of preparing phenylthiopyruvic acid, which consists in heating, at temperatures between 40° and 50° C., the product of the following formula:

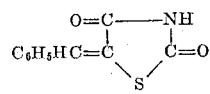

with a 15% caustic soda solution for at least 24 hours and recovering the phenylthiopyruvic acid.

2. A process of preparing phenylthiopyruvic acid, which consists in heating the product of the following formula:

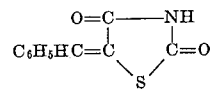

with an alkali, at a temperature not exceeding 50° C. for about 24 hours, and recovering the phenylthiopyruvic acid.

JEAN GUSTAVE HIMBERT.
DAVID LIBERMANN.

REFERENCES CITED

The following references are of record in the file of this patent:

UNITED STATES PATENTS

| Number | Name | Date |
| --- | --- | --- |
| 2,165,219 | Brooker | July 11, 1939 |

OTHER REFERENCES

Granacher: Helv. Chim. Acta., vol. 3, pp. 152-162 (1920).

Granacher: Helv. Chim. Acta., vol. 5, pp. 610-616 (1922).

Bondzynski: Beilstein (Handbuch, 4th ed.), vol. 10, p. 685 (1927).

Markley et al.: J. Am. Chem. Soc., vol. 52, pp. 2981-2984 (1930).

Zipsen: Beilstein (Handbuch, 4th ed.), vol. 27, p. 233 (1937).

Andreaseh: Beilstein (Handbuch, 4th ed.), vol. 27, pp. 271-272 (1937).

Holmberg et al.: Beilstein (Handbuch, 4th ed.), vol. 27, suppl., p. 334 (1938).

Kucera: Beilstein (Handbuch, 4th ed.), vol. 27, suppl., p. 335 (1938).